B. HOLT.
TRACTION ENGINE.
APPLICATION FILED AUG. 2, 1915.
1,258,603.
Patented Mar. 5, 1918.
2 SHEETS—SHEET 1.
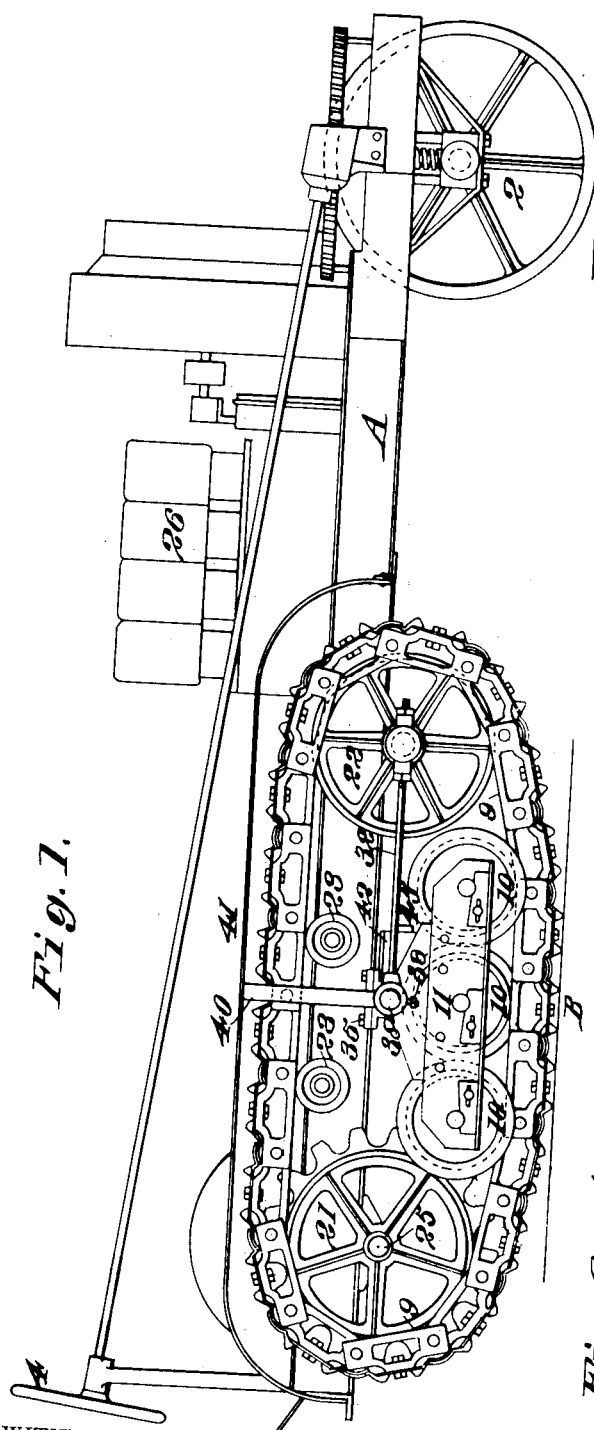
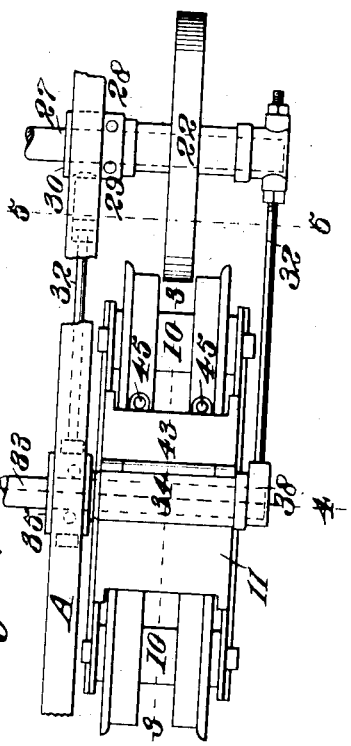
WITNESSES:
Charles Pickla
J. H. Herring
INVENTOR
Benjamin Holt
BY Strong and Townsend
ATTORNEYS

B. HOLT.
TRACTION ENGINE.
APPLICATION FILED AUG. 2, 1915.

1,258,603.

Patented Mar. 5, 1918.
2 SHEETS—SHEET 2.

WITNESSES:
Charles Rickles
J. H. Herring

INVENTOR
Benjamin Holt
BY Stronger Townsend
ATTORNEYS

UNITED STATES PATENT OFFICE.

BENJAMIN HOLT, OF STOCKTON, CALIFORNIA, ASSIGNOR TO HOLT MANUFACTURING COMPANY, OF STOCKTON, CALIFORNIA, A CORPORATION OF CALIFORNIA.

TRACTION-ENGINE.

1,258,603.   Specification of Letters Patent.   Patented Mar. 5, 1918.

Application filed August 2, 1915.  Serial No. 43,073.

*To all whom it may concern:*

Be it known that I, BENJAMIN HOLT, a citizen of the United States, residing at Stockton, in the county of San Joaquin and State of California, have invented new and useful Improvements in Traction-Engines, of which the following is a specification.

This invention relates to traction engines and pertains especially to traction engines and other vehicles of the self-laying track variety.

The particular object of the invention is to provide a low, small, light and powerful tractor particularly adapted for farm, agricultural and horticultural purposes, capable of working in narrow and shallow spaces between and under trees in orchards, vineyards and the like. There are further and special objects that will be indicated hereinafter.

The invention consists of the parts, and the combination and construction of parts as hereinafter more fully described and claimed, having reference to the accompanying drawings, in which—

Figure 1 is a side elevation of the machine.

Fig. 2 is a detail plan view of the truck.

Fig. 3 is a vertical longitudinal section on line 3—3 of Fig. 2.

Figure 4:
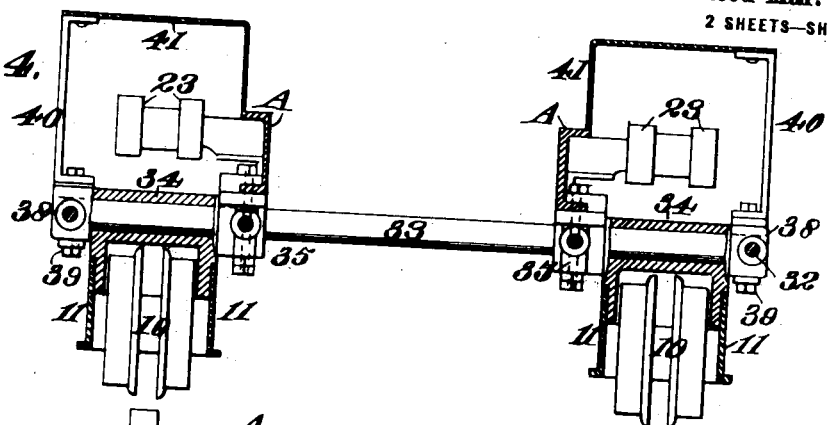
Fig. 4 is a vertical transverse section across the machine on line 4—4 of Fig. 2.
Figure 5:
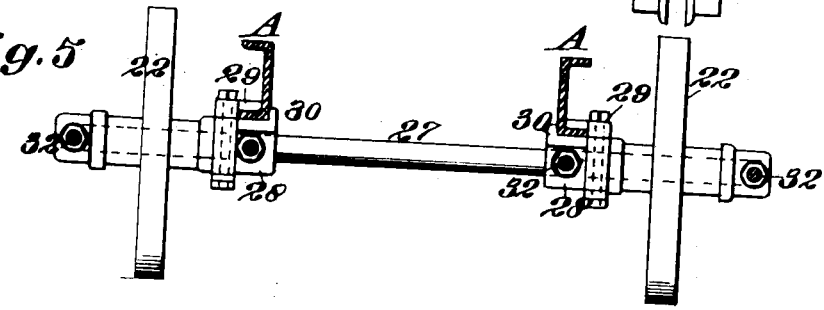
Fig. 5 is a like section to Fig. 4 on line 5—5, Fig. 2.

A is the main frame of the tractor, preferably constructed of longitudinal channel iron sills, suitably cross braced to form a rigid structure. The front end of the frame is spring supported on a steering wheel 2 controlled from the driver's seat 3 at the rear by the tiller wheel 4 and appropriate steering connections; the rear end of the frame being supported upon a pair of endless, flexible self-laying tracks B of special construction.

The endless tracks B are adapted to pass around respective rear drive sprockets 21 and front idlers 22; the upper run of the belts being supported on idle rollers 23, which are secured to the main frame A.

The rear sprockets 21 are mounted on drive shaft 25 having suitable drive connections, not necessary here to be shown, with appropriate motor, as 26. Drive shaft 25 is mounted direct on the main frame and need not be adjustable. The forward idlers 22 however, are each made adjustable in order to provide for take-up of the track belt. Accordingly each front idler 22 rotates on shaft 27 mounted in a box 28, which is adjustable lengthwise of frame A, by means of the clamps 29; there being a clamp member to bear on top of one of the flanges of a side beam on frame A, and an upturned complementary clamp member 30 to bear against the inside vertical face of said beam, the bearing faces 29—30 being of sufficient length to give a broad bearing to prevent the idler or its box rocking or warping. The adjustment of the sprocket 21 is accomplished by a pair of push rods 32 extending rearwardly and supported against the shaft 33 on which the rocking trucks 11 fulcrum. The rocking trucks 11 each have boxes 34 fulcruming on a cross shaft 33, which is mounted in fixed bearings 35 on the frame A. One of the rearwardly extending push rods 32 bears directly against bearing 35, and the other push rod 32 has a foot piece 38 which is locked to the outer end of the shaft 33 by suitable means, as the set screw 39; the truck bearing 34 rocking between the box 35 and the foot piece 38.

Foot piece 38 also forms a point of attachment for a strap 40 forming a central support for the guard plate 41, which extends over the endless track. This provision of a pair of push rods 32 and the adjustable bearing 28 for the idlers 21 constructed and arranged to bear against the transverse fulcrum shaft 33 affords a simple, practical, compact belt tightening and adjusting means for the traction belt, as it requires only very short push rods and does not interfere in any way with the free oscillating movements of the trucks 11.

Another feature of the invention is the oiling means for the truck rollers 10. As here shown an oil fount 42, with a hinged cover 43 is formed on, or in the truck 11, and is adapted to receive the lubricant which is dispensed through a pair of oil outlets 44, each controlled by a valve 45; these oil outlets 44 being so arranged that each one will allow the oil to drop on a corresponding truck roller immediately beneath. It is customary only to oil the pair of front idlers, as they will distribute the oil to the track rails, and these will in turn oil the succeeding pairs of rollers.

While I have particularly shown the invention as applicable to a traction engine, it is obvious that it is adapted to vehicles generally of the self-laying track variety, whether tractors or trailer wagons.

Having thus described the invention, what is claimed and desired to secure by Letters Patent is—

1. In a traction engine, the combination of a main frame having its front end supported on a steering wheel, a pair of endless, self-laying tracks on which the rear of the frame is supported, a driver's seat at the rear and steering means extending forward therefrom to the steering wheel, a rear sprocket and front idler for each self-laying track mounted on the frame, a rocking truck for each track intermediate of its sprocket and idler, said truck having flanged rollers running on the track rails, each idler having a sliding bearing on the frame, push rods extending from the truck fulcrum to said adjustable bearing, and lubricating means for the track rollers and track.

2. In a traction engine, the combination of a main frame mounted on a pair of endless, self-laying tracks, a rear sprocket and a front idler arranged in line around which a respective track passes, an intermediate rocking truck having rollers running on a track, the front idler having bearings adjustable on the main frame, a pair of push rods connected with said adjustable bearing extending back to the fulcrum of the rocking truck and on each side thereof.

3. In a traction engine, the combination of a main frame supported on a pair of endless, self-laying tracks, a drive shaft journaled in the main frame carrying rear drive sprockets around which the endless tracks pass, front idlers for the tracks independently adjustable on the main frame, an intermediate shaft extending transversely of the frame and mounted thereon, trucks having a rocking bearing on each end of said shaft said trucks having rollers running on the tracks, and push rods bearing against said truck shaft and connected to the adjustable bearing of the idlers.

4. In a traction engine, the combination of a main frame supported on a pair of endless, self-laying tracks, a drive shaft journaled in the main frame carrying rear drive sprockets around which the endless tracks pass, front idlers for the tracks independently adjustable on the main frame, intermediate supporting trucks having rollers running on the tracks, and push rods bearing against said trucks and connected to the adjustable bearing of the idlers.

5. In a traction engine, the combination of a main frame supported on a pair of endless, self-laying tracks, a drive shaft journaled in the main frame carrying rear drive sprockets around which the endless tracks pass, front idlers for the tracks independently adjustable on the main frame, intermediate supporting trucks having rollers running on the tracks, and means to adjust the position of the idlers in relation to said trucks, said means comprising adjustable struts connecting the bearings of the idlers and the trucks.

In testimony whereof I have hereunto set my hand in the presence of two subscribing witnesses.

BENJAMIN HOLT.

Witnesses:
O. H. ENLESTON,
W. T. LEWIS.